United States Patent Office 3,189,651
Patented June 15, 1965

3,189,651
PROCESS FOR PREPARING HEXAMETHYLENEDI-
AMINE COMPOUNDS FROM 5-AMINOMETHYL-
2-FURFURYLAMINE COMPOUNDS
John D. Garber, Westfield, and Robert A. Gasser, North
Plainfield, N.J., and Robert Ellery Jones, North
Muskegon, Mich., assignors to Merck & Co., Inc.,
Rahway, N.J., a corporation of New Jersey
No Drawing. Filed Jan. 16, 1962, Ser. No. 166,697
8 Claims. (Cl. 260—583)

This invention relates to the preparation of aliphatic amino compounds. More particularly it relates to a method for obtaining aliphatic amino compounds from furan compounds. Specifically, it relates to the preparation of hexamethylene-diamine from 5-aminomethyl-2-furfurylamine, its alkylated and alkanoylated derivatives and its acid addition salts.

This application is a continuation-in-part of copending application Serial No. 760,057 filed September 10, 1958, now abandoned.

Hexamethylenediamine is an important intermediate in the preparation of synthetic fibrous materials, such as, for example, nylon. It would be extremely desirable to provide the industry with a simple process for obtaining this compound from relatively inexpensive and readily accessible starting materials. Such starting materials are represented by 5-aminomethyl-2-furfurylamine, its lower alkylated and alkanoylated derivatives and its acid addition salts. From the vast amount of knowledge compiled with regard to the chemistry of furan compounds, it is generally known that when such compounds are subjected to hydrogenation, a wide variety of reaction products are obtained. However, previous attempts at obtaining any one compound in good yield from furan compounds have been futile, in consequence of the many side reactions taking place. It is an object of this invention to provide a process for hydrogenating a particular group of furan compounds to obtain good yields of an aliphatic diamine. It is a further object of this invention to provide a process for producing hexamethylene-diamine from 5-aminomethyl-2-furfurylamine and its derivatives to the substantial exclusion of ring saturated furans and hydroxy substituted hexamethylenediamine.

In accordance with the present invention it has been discovered that hexamethylenediamine may be produced in good yield from 5-aminomethyl-2-furfurylamine, its lower alkylated or alkanoylated derivatives and its acid addition salts, by hydrogenating the starting material in the presence of a large amount of platinum catalyst, a lower aliphatic acid and a mineral acid. When carried out using the critical reaction conditions hereinafter specified, the process is essentially devoid of the detrimental side reactions normally considered to accompany the hydrogenation of furan compounds, and there are obtained yields of hexamethylenediamine ranging from about 25% to 60% and higher. The following flow diagram represents the conversion of the starting materials;

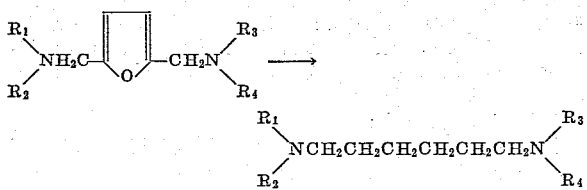

where $R_1$, $R_2$, $R_3$ and $R_4$ may be hydrogen, lower alkyl or lower alkanoyl. Typical of the compounds which may be treated in accordance with the method of the present invention are 5-aminomethyl-2-furfurylamine, N,N' dimethyl-5-aminomethyl-2-furfurylamine, N,N' di-butyl 5 aminomethyl-2-furfurylamine, N propyl 5-aminomethyl-2-furfurylamine, N,N'-diacetyl 5-aminomethyl-2-furfurylamine, N,N'-dipropionyl 5-aminomethyl-2-furfurylamine, N-butyl 5-aminomethyl-2-furfurylamine and the like, and the acid addition salts of these compounds as exemplified by those obtained when these compounds are treated with such acids as acetic acid, propionic acid, butyric acid, hydrochloric acid, hydrobromic acid, sulfuric acid, phosphoric acid, and the like.

The success of the method of the present invention is contingent upon using relatively large amounts of the catalyst in carrying out the hydrogenation in combination with a lower aliphatic acid and a mineral acid. The catalyst employed is platinum oxide as charged to the reaction system. Under the reaction conditions employed, however, the oxide is converted to elemental platinum, and it is the free metal which acts as the catalyst. In particular, the amount of catalyst used, for either a batch process or a fixed bed reactor must be equivalent to at least 0.25 mole of platinum per mole of starting material being hydrogenated. The preferred range however, is between 0.5–2.0 moles of catalyst per mole of starting material although larger amounts may be used if desired. When the reaction is run over a fixed catalyst bed, it is preferred to have as high a ratio as possible. It will be appreciated by those skilled in the art that the ratio values may be converted to units more commonly used in that sphere of technology by considering the volume of fixed catalyst, volume flow rate of the reaction mixture thereover and the like.

The mineral acids used in the process of the present invention are exemplified by hydrochloric, hydrobromic, hydrofluoric, sulfuric and phosphoric acid and various forms of phosphoric acid, such as metaphosphoric, polyphosphoric and phosphorous acids. The lower aliphatic acid may be supplied as the free acid or by way of any acid soluble salt thereof such as the alkaline earth and alkali metal salts, which upon contact with the mineral acid will be converted to the free organic acid. Typical of the aliphatic acids which may be employed are acetic acid, propionic acid, butyric acid and the like. With regard to the amounts of each of these to be used, it has been found that the mineral acid should be supplied in a ratio of at least 0.5 mole per mole of the starting material. The preferred range for optimum results is between 1 and 5 moles of acid per mole of starting material. The amount of the aliphatic acid supplied is not critical. It is preferred, however that it be present in large excess, since one of its functions is to serve as a solvent. The preferred range is between 10 and 100 moles per mole of starting material although values outside this range will yield suitable results.

It is one of the advantages of the present invention, that hexamethylenediamine, its derivatives and acid addition salts, may be obtained from the furan starting materials by using very mild hydrogenation conditions. For example, the reaction requires temperatures no higher than 150° C. The preferred operating range however, is between 15° C. and 75° C. Lower temperatures may be employed though without any beneficial result. The hydrogen pressure employed is similarly mild. Pressures slightly greater than atmospheric and preferably ranging from 20 to 100 lbs. per square inch gauge yield suitable results, although pressures as high as 10,000 lbs. per square inch may be employed without detrimentally affecting the yield of the process.

In a preferred embodiment of the instant process, it is desirable to preheat a mixture of the starting material and the acids, with or without the catalyst. A preheating temperature of between about 30 and 100° C. for a period of from 5 to 60 minutes will generally be suitable. Where the subsequent hydrogenation takes place at a temperature of about 30° C. and above, the preheating is accomplished during the hydrogenation. Where however the hydrogenation is run at temperatures below about 30° C., it is desirable to include the preheating step at the above indicated temperatures. It will be understood however that the term "preheat" as used herein is meant to be inclusive of allowing the reaction mixture to stand for extended periods of time at room temperature and below prior to hydrogenation.

At the conclusion of the reaction, the final product exists in solution as the acid addition salt of the starting amine corresponding to the particular acids used in the reaction, or as the free alkylated or alkanoylated compound if there are no basic hydrogen atoms present on the original starting material. The desired product, hexamethylenediamine, may be isolated from the reaction mixture by techniques well known in the art. For example, the reaction mass may be filtered free of the catalyst and the clear filtrate neutralized with base such as, for example sodium, potassium or calcium hydroxide, calcium oxide, sodium carbonate, and the like, so as to convert the salt to the free amine. Where the final product is in the form of the alkylated or alkanoylated compound, the filtrate may be treated with base and refluxed to remove the alkyl or alkanoyl radical by saponification. This is particularly desirable when the hydrogenation has been carried out at the higher temperatures herein indicated, for the reason that during the reaction the final product may have been alkanoylated by the aliphatic acids employed. The free amine may thereafter be obtained by sublimation or distillation in vacuum or by solvent extraction using inert, polar, water-immiscible solvents such as for example, methylene chloride, ethyl acetate and the like.

The 5-aminomethyl-2-furfurylamine used in the process of the present invention may be prepared in accordance with the method disclosed in U.S. Patent 2,989,546. The alkylated and alkanoylated compounds and the acid addition salts of these compounds may be prepared from the free amine by means well known in the art.

The following examples are given for purposes of illustration only and are not intended to limit the scope of the present invention.

*Example I*

To 1.26 g. (0.01 mole) for 5-aminomethyl-2-furfurylamine dissolved in 50 ml. of glacial acetic acid is added 3.0 g. (0.03 mol) of 98% sulfuric acid. Crystals of the sulfate salt form at once. The mixture is heated to 60–65° C. and held at that temperature for 10 minutes. Then 4.0 g. of PtO$_2$ (0.0175 mol) is added and the mixture shaken at a pressure of 40 p.s.i.g. of hydrogen at 50° C. After the reaction is complete the catalyst is removed by filtration and the water-white filtrate stirred with 5.4 g. (0.065 mol) of sodium acetate to neutralize the sulfuric acid. The acetic acid is removed as completely as possible via vacuum distillation. The residue is dissolved in water and made basic with caustic, refluxed for a short time to insure the hydrolysis of any acetylated hexamethylenediamine and extracted with methylene chloride. The solvent layer is dried and the product hexamethylenediamine is recovered by sublimation at between 70–120° C. at 0.40 mm. in 44% yield. Only minor amounts of 2-hydroxy 1,6 hexanediamine and 5-aminomethyl-2-tetrahydrofurfurylamine are formed.

When the above procedure is repeated using equivalent amounts of hydrochloric acid, hydrobromic acid, hydrofluoric acid, phosphoric acid, metaphosphoric acid, polyphosphoric acid, or phosphorous acid in place of the sulfuric acid, similar results are obtained.

*Example II*

The procedure of Example I is repeated except that a hydrogen pressure of 6,000 p.s.i. is employed. There are no significant changes in yield.

*Example III*

The procedure of Example I is followed except that prior to the addition of the platinum oxide the starting material is preheated at 50° for 10 minutes and then hydrogenated at 25° for 3 hours under 40 lbs. per square inch gauge of hydrogen pressure. The product hexamethylenediamine is obtained in 52% yield.

When hydrogenation conditions of 140° C. and 20 p.s.i.g. are employed in the above procedure, there is no significant change in yield.

When the preheating step is eliminated from the above procedure, the yield of final product is of the order of 20–30%.

Similar results are obtained when the above procedure is repeated using an equivalent amount of propionic acid or butyric acid in place of the acetic acid.

*Example IV*

The procedure of Example I is followed except that prior to the addition of the platinum catalyst the reaction mixture is preheated for 30 minutes at 50° C. and then hydrogenated for 6 hours at 100° C. under hydrogen pressure of 40 lbs. per square inch. The hexamethylenediamine is obtained in 34% yield.

When this procedure is repeated using half the amount of the catalyst and hydrogenated at 75° C. for 6½ hours the yield of final product is 42%.

Similar results are obtained when the above procedure is repeated using N,N' dimethyl 5-aminomethyl-2-furfurylamine, N,N' dipropyl 5-aminomethyl-2-furfurylamine, N-butyl 5-aminomethyl-2-furfurylamine, N,N' diacetyl 5-aminomethyl-2-furfurylamine, N,N' dibutyryl-5-aminomethyl-2-furfurylamine or N-propionyl-5-aminomethyl-2-furfurylamine in place of the 5-aminomethyl-2-furfurylamine.

*Example V*

This experiment shows the effect of the absence of a mineral acid on the yield of hexamethylenediamine.

To a solution of 1.25 g. (0.01 mol) of 5-aminomethyl-2-furfurylamine in 50 ml. glacial acetic acid is added 0.5 g. of platinum oxide catalyst. The mixture is subjected to hydrogenation conditions of 1000 p.s.i.g. at 150° C. for 20 hours. After work-up as in Example I, there results a 33% yield of 2-hydroxy 1,6-hexanediamine and only minor amounts of hexamethylenediamine.

*Example VI*

This experiment shows the effect of the absence of the acetate ion on the yield of hexamethylenediamine.

To a solution of 1.26 g. of 5-aminomethyl-2-furfurylamine in 65 ml. of water containing 0.043 mole of hydrochloric acid is added 0.5 g. of platinum oxide. Hydrogenation is commenced at 40 p.s.i.g. and 25° C. and terminated when hydrogen up-take ceases. The filtrate is treated in the manner of Example I and there results a 20% yield of 2-hydroxy 1,6-hexanediamine and only a small amount of hexamethylenediamine.

It will be obvious to those skilled in the art that certain changes and modifications may be made in the process of the present invention without departing from the spirit and scope thereof. All such changes and modifications are intended to be encompassed within the appended claims.

What is claimed is:

1. The process for preparing acid addition salts of compounds having the structural formula

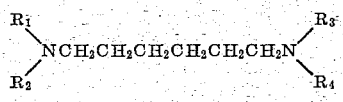

wherein R$_1$, R$_2$, R$_3$ and R$_4$ are selected from the group consisting of hydrogen, lower alkyl and lower alkanoyl which comprises treating a furan compound of the formula

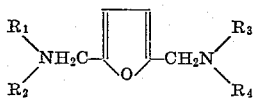

with hydrogen in the presence of a platinum catalyst, a lower aliphatic acid having less than 5 carbon atoms and a mineral acid selected from the group consisting of sulfuric acid, hydrochloric acid, hydrobromic acid, hydrofluoric acid, phosphoric acid, metaphosphoric acid, polyphosphoric acid and phosphorous acid at a temperature less than 150° C. and a pressure greater than atmospheric pressure and wherein said catalyst is present to the extent of at least 0.25 mole per mole of said furan compound.

2. The process for preparing acid addition salts of hexamethylenediamine which comprises treating 5-aminomethyl-2-furfurylamine with hydrogen in the presence of a platinum catalyst, acetic acid and a mineral acid selected from the group consisting of sulfuric acid, hydrochloric acid, hydrobromic acid, hydrofluoric acid, phosphoric acid, metaphosphoric acid, polyphosphoric acid and phosphorous acid at a temperature less than 150° C. and a pressure greater than atmospheric pressure and wherein said catalyst is present to the extent of at least 0.25 mole per mole of said 5-aminomethyl-2-furfurylamine.

3. The process for preparing acid addition salts of hexamethylenediamine which comprises contacting 5-aminomethyl-2-furfurylamine with hydrogen in the presence of a platinum catalyst, acetic acid and sulfuric acid at a temperature less than 150° C. and a pressure greater than atmospheric and wherein said catalyst is present to the extent of at least 0.25 mole per mole of said 5-aminomethyl-2-furfurylamine.

4. The process for preparing acid addition salts of hexamethylenediamine which comprises contacting 5-aminomethyl-2-furfurylamine with hydrogen in the presence of a platinum catalyst, acetic acid and sulfuric acid at a temperature between 15° C. and 75° C. and at a pressure between 20 and 100 lbs. per square inch gauge and wherein said catalyst is present to the extent of between 0.5–2.0 moles per mole of said 5-aminomethyl-2-furfurylamine, said acetic acid is present to the extent of between 10–100 moles per mole of said 5-aminomethyl-2-furfurylamine and said sulfuric acid is present to the extent of between 0.5–5 moles per mole of said 5-aminomethyl-2-furfurylamine.

5. The method for preparing hexamethylenediamine which comprises contacting 5-aminomethyl-2-furfurylamine with hydrogen in the presence of a platinum catalyst, a lower aliphatic acid having less than 5 carbon atoms and a mineral acid selected from the group consisting of sulfuric acid, hydrochloric acid, hydrobromic acid, hydrofluoric acid, phosphoric acid, metaphosphoric acid, polyphosphoric acid and phosphorous acid at a temperature less than 150° C. and a pressure greater than atmospheric pressure and wherein said catalyst is present to the extent of at least 0.25 mole per mole of said 5-aminomethyl-2-furfurylamine and thereafter neutralizing the product thus obtained with base.

6. The method for preparing hexamethylenediamine which comprises contacting 5-aminomethyl-2-furfurylamine with hydrogen in the presence of a platinum catalyst, acetic acid and sulfuric acid at a temperature of between 15–75° C. and a pressure of between 20–100 lbs. per square inch gauge and wherein the platinum catalyst is present to the extent of between 0.5–2.0 moles per mole of 5-aminomethyl-2-furfurylamine, the acetic acid is present to the extent of between 10–100 moles per mole of 5-aminomethyl-2-furfurylamine and the sulfuric acid is present to the extent of between 1–5 moles per mole of 5-aminomethyl-2-furfurylamine and thereafter neutralizing the product thus obtained with base.

7. The method for producing acid addition salts of hexamethylenediamine which comprises heating a mixture comprising 5-aminomethyl-2-furfurylamine, a lower aliphatic acid having less than 5 carbon atoms and a mineral acid selected from the group consisting of sulfuric acid, hydrochloric acid, hydrobromic acid, hydrofluoric acid, phosphoric acid, metaphosphoric acid, polyphosphoric acid and phosphorous acid at a temperature of greater than approximately 30° C. and thereafter treating said mixture with hydrogen in the presence of a platinum catalyst at a temperature less than 150° C. and a pressure greater than atmospheric pressure and wherein said catalyst is present to the extent of at least 0.25 mole per mole of 5-aminomethyl-2-furfurylamine.

8. The method for producing acid addition salts of hexamethylenediamine which comprises heating a mixture comprising 5-aminomethyl-2-furfurylamine, acetic acid and sulfuric acid at a temperature of greater than approximately 30° C. and thereafter treating said mixture with hydrogen in the presence of a platinum catalyst at a temperature between 15–75° C. and a pressure between 20–100 lbs. per square inch gauge and wherein said catalyst is present to the extent of between 0.5–2.0 moles per mole of 5-aminomethyl-2-furfurylamine, said acetic acid is present to the extent of 10–100 moles per mole of 5-aminomethyl-2-furfurylamine and said sulfuric acid is present to the extent of between 1–5 moles per mole of 5-aminomethyl-2-furfurylamine.

References Cited by the Examiner

Kaufmann et al.: J. Am. Chem. Soc., volume 45, pages 3029–44 (1923).

Keimatsu et al.: Chem. Abstract, volume 21, page 3362 (1927).

Bailey et al.: J. Am. Chem. Soc., volume 71, pages 2886–2889 (1949).

CHARLES B. PARKER, *Primary Examiner.*

UNITED STATES PATENT OFFICE
CERTIFICATE OF CORRECTION

Patent No. 3,189,651 June 15, 1965

John D. Garber et al.

It is hereby certified that error appears in the above numbered patent requiring correction and that the said Letters Patent should read as corrected below.

Column 2, line 3, for "N-butyl" read -- N-butryl --; column 4, line 4, for "50°" read -- 50° C. --; line 5, for "25°" read -- 25° C. --; same column 4, line 41, for "1.25" read -- 1.26 --.

Signed and sealed this 7th day of December 1965.

(SEAL)
Attest:

ERNEST W. SWIDER
Attesting Officer

EDWARD J. BRENNER
Commissioner of Patents